United States Patent [19]
Suzuki et al.

[11] Patent Number: 5,642,245
[45] Date of Patent: Jun. 24, 1997

[54] TAPE CASSETTE INFORMATION DETECTING MECHANISM AND REEL LOCK RELEASING MECHANISM FOR RECORDING AND REPRODUCING APPARATUS

[75] Inventors: Kazuyoshi Suzuki, Tokyo; Akihiro Uetake, Kanagawa; Toshio Mamiya, Tokyo; Katsuji Akimoto, Tokyo; Masaki Takase, Tokyo, all of Japan

[73] Assignee: Sony Corporation, Tokyo, Japan

[21] Appl. No.: 272,072

[22] Filed: Jul. 8, 1994

[30] Foreign Application Priority Data

Jul. 12, 1993 [JP] Japan ................... 5-171733

[51] Int. Cl.$^6$ .................. G11B 21/02; G11B 5/008
[52] U.S. Cl. .................. 360/71; 360/94; 360/96.5
[58] Field of Search ............... 360/85, 95, 96.5, 360/69, 71, 94

[56] References Cited

U.S. PATENT DOCUMENTS

| | | | |
|---|---|---|---|
| 4,807,077 | 2/1989 | Zaitsu et al. | 360/132 |
| 4,903,149 | 2/1990 | Hasegawa et al. | 360/96.5 |
| 4,965,683 | 10/1990 | Otani | 360/71 |
| 5,105,319 | 4/1992 | Ohoka et al. | 360/96.5 |
| 5,314,141 | 5/1994 | Ishii et al. | 360/94 |
| 5,359,477 | 10/1994 | Yamashita et al. | 360/85 |
| 5,386,334 | 1/1995 | Uetake | 360/132 |

FOREIGN PATENT DOCUMENTS

| | | |
|---|---|---|
| 796553 | 7/1973 | Belgium . |
| 0463786 | 1/1992 | European Pat. Off. . |
| 0599718 | 6/1994 | European Pat. Off. . |
| 2101967 | 1/1983 | United Kingdom . |

*Primary Examiner*—W. C. Kim
*Assistant Examiner*—Regina Y. Neal
*Attorney, Agent, or Firm*—William S. Frommer; Alvin Sinderbrand

[57] ABSTRACT

A recording and reproducing apparatus can translate a detecting device for detecting information, such as the kind and content of tape cassette and a reel lock mechanism releasing device to proper positions corresponding to tape cassettes of different sizes. A tape cassette information detecting device (71) and reel lock releasing device (72a, 72b) can be translated to positions at which large and small tape cassettes are in use through a swing drive member (54), a translating lever (73), a driving link (74), a detection mechanism holding member (75) and a reel lock releasing plate (77) in unison with a movement of reel mounts (44, 45).

3 Claims, 11 Drawing Sheets

TAPE CASSETTE INFORMATION DETECTING MECHANISM AND REEL LOCK RELEASING MECHANISM FOR RECORDING AND REPRODUCING APPARATUS

BACKGROUND OF THE INVENTION

The present invention relates to recording and reproducing apparatus and, more particularly, to a recording and reproducing apparatus in which two tape cassettes of different sizes in which spacings between a supply reel and a take-up reel around which a recording medium tape is wrapped are different can be loaded and two reel mounts that are respectively in engagement with the supply reel and the take-up reel are translated at different positions.

Heretofore, there is a recording and reproducing apparatus in which two reel mounts can be translated to different positions. This recording and reproducing apparatus includes detecting means for detecting information, such as the kind of a tape cassette and a tape cassette content disposed at a common position of a mechanical deck portion so that the detecting means can be served for both tape cassettes of different sizes. Alternatively, this recording and reproducing apparatus includes detecting means disposed at corresponding positions of respective tape cassettes and the detecting means which is not in use is disposed at the position in which it may not disturb the other one when each of the tape cassette is loaded onto the recording and reproducing apparatus in use.

Further, similarly, the recording and reproducing apparatus includes a reel lock mechanism releasing means for releasing a reel lock mechanism which prevents tape reels from being rotated within the tape cassette. This releasing means is disposed at the common position of the mechanical deck portion so that the releasing means can be served for both tape cassettes of different sizes. Alternatively, the recording and reproducing apparatus includes the releasing means at the positions corresponding to the respective tape cassettes so that the releasing means that is not in use is disposed at the position so as not to disturb the other releasing means when the two tape cassettes are loaded onto the recording and reproducing apparatus in use.

When however the recording and reproducing apparatus is used under the condition that the detecting means for detecting information, such as the kind of the tape cassette and the tape cassette content and the reel lock mechanism releasing means are not translated, there is then the disadvantage that the size and the weight of members on the mechanical deck portion are increased.

Furthermore, depending on tape formats, the detecting means and the releasing means interfere with other members, such as the tape cassette or the mechanical deck so that the detecting means and the releasing means cannot function or the recording and reproducing apparatus is considerably restricted from a design standpoint. In addition, there is the disadvantage that the mechanism itself becomes complex in arrangement.

SUMMARY OF THE INVENTION

In view of the aforesaid aspect, it is an object of the present invention to provide a recording and reproducing apparatus in which detecting means for detecting information, such as the kind of tape cassette and a tape cassette content and reel lock mechanism releasing means can be translated to proper positions in response to tape cassettes of different sizes.

According to a first aspect of the present invention, there is provided a recording and reproducing apparatus in which two tape cassettes of different sizes having supply reels and take-up reels spaced apart by different widths around which a recording medium tape is wound are loaded and two reel mounts which respectively come in engagement with the supply reel and the take-up reel are translated at different positions. The recording and reproducing apparatus comprises a detecting device provided in an equipment body of the recording and reproducing apparatus for detecting information, such as kind and content of said tape cassette, and a device for translating the detecting device to positions corresponding to the tape cassettes of different sizes.

According to a second aspect of the present invention, there is provided a recording and reproducing apparatus in which two tape cassettes of different sizes having supply reels and take-up reels spaced apart by different widths around which a recording medium tape is wound are loaded and two reel mounts which respectively come in engagement with the supply reel and the take-up reel are translated at different positions. The recording and reproducing apparatus comprises a releasing device provided in an equipment body of the recording and reproducing apparatus for releasing a reel lock mechanism which inhibits the two tape reels from being rotated within a tape cassette, the releasing device being translated to positions corresponding to the tape cassettes of different sizes.

In accordance with a third aspect of the present invention, there is provided a recording and reproducing apparatus in which two tape cassettes of different sizes having supply reels and take-up reels spaced apart by different widths around which a recording medium tape is wound are loaded and two reel mounts which respectively come in engagement with the supply reel and the take-up reel are translated at different positions. The recording and reproducing apparatus comprises a detecting device provided in an equipment body of the recording and reproducing apparatus for detecting information, such as kind and content of the tape cassette, and a releasing device provided in an equipment body of the recording and reproducing apparatus for releasing a reel lock mechanism which inhibits the two tape reels from being rotated within a tape cassette, wherein when the reel mount is translated, the detecting device and the releasing device can be translated to positions corresponding to the tape cassettes of different sizes in unison with each other.

DETAILED DESCRIPTION OF THE PREFERRED EMBODIMENT

A recording and reproducing apparatus according to an embodiment of the present invention will be described below with reference to the drawings. Initially, outlines of two large and small tape cassettes used in the recording and reproducing apparatus of the present invention will be described.

Figure 1:
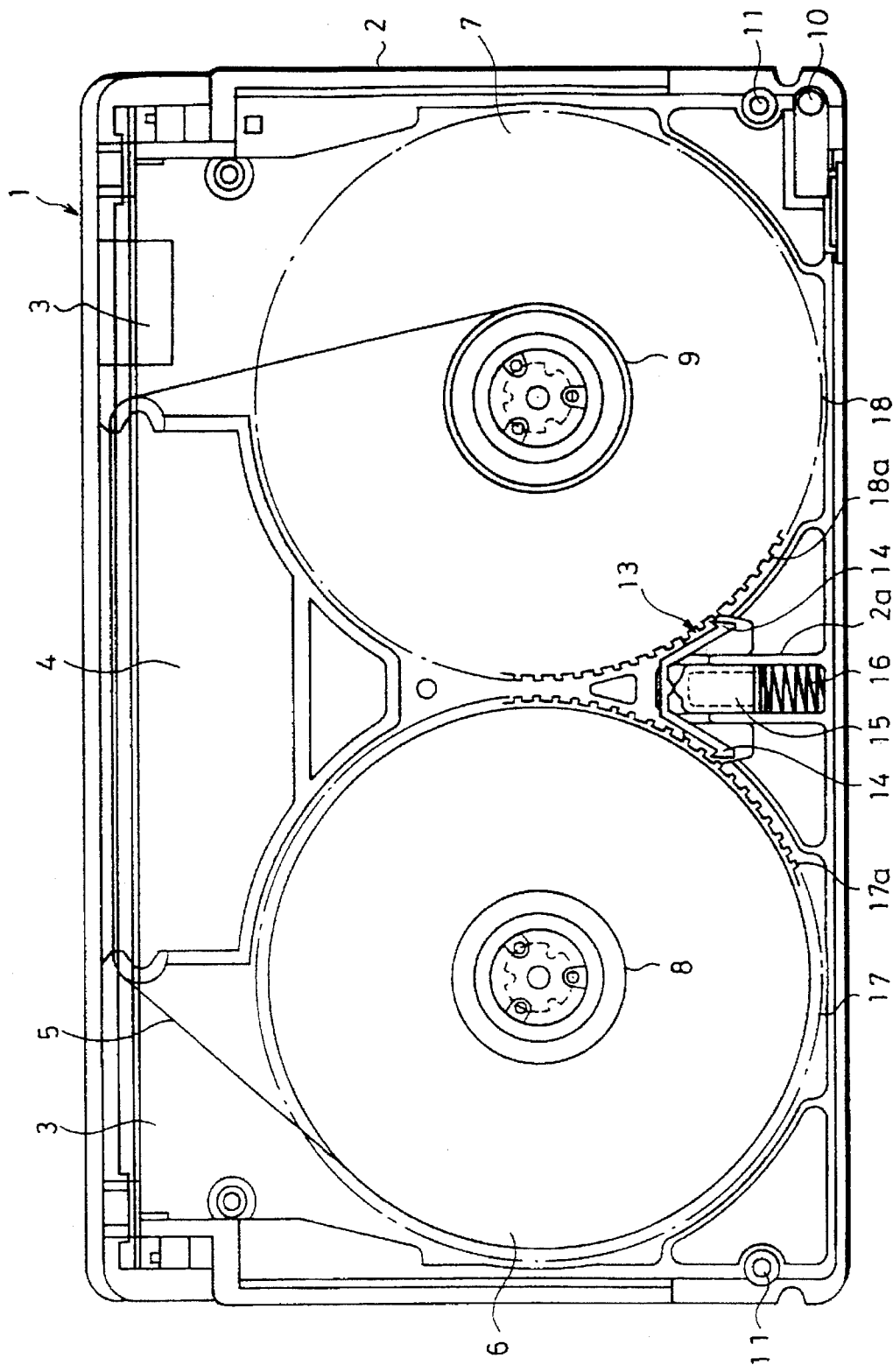
FIG. 1 is a plan view showing the inside of a large tape cassette.
Figure 2:
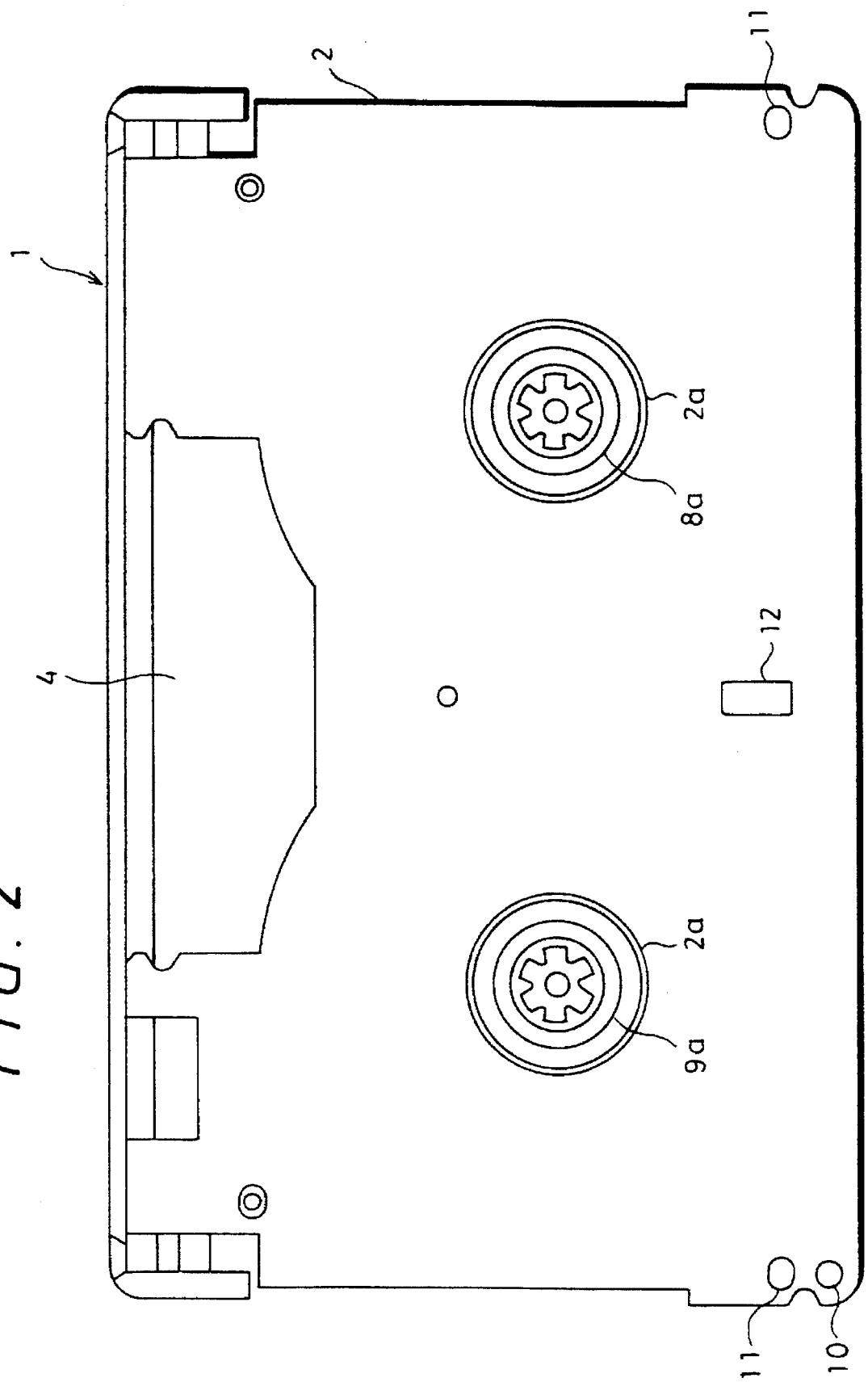
FIG. 2 is a bottom view of the large tape cassette.

FIG. 1 of the accompanying drawings shows a plan view of a large tape cassette with its upper cassette shell being removed. FIG. 2 is a bottom view of the large tape cassette. The large tape cassette is generally depicted by reference numeral 1 and reference numeral 2 depicts a cassette case of the large tape cassette 1 in FIGS. 1 and 2.

The cassette case 2 is flat box in shape and oblong rectangle as seen from above. The cassette case 2 has tape exits 3 formed at left and right end portions of its front surface. A mouth portion 4 which is forwardly and downwardly opened is formed between the tape exits 3 formed at left and right end portions.

The cassette case 2 houses therein a supply tape reel 6 and a take-up tape reel 7 provided pivotally to and on which respective ends of a magnetic tape 5 is fixed and wound. The tape reels 6 and 7 include reel hubs 8 and 9 through which there are bored reel mount engagement apertures 8a and 9a opened downwardly. The reel mount engagement apertures 8a and 9a are exposed to the outside through reel mount insertion apertures 2a and 2b bored through the bottom wall of the cassette case 2. A part of the magnetic tape 5 is withdrawn from the tape exits 3 to the outside of the cassette case 2 and placed along the front wall of the mouth portion 4.

A front lid is pivotally supported to the front wall of the cassette case 2 so as to open and close the front surface of the magnetic tape 5 stretched along the front wall of the cassette case 2, though not shown.

The cassette case 2 includes at one end portion of its bottom wall provided a recognition hole 10 for detecting information, such as a kind of tape cassette and a tape cassette content. The cassette case 2 also includes at its respective end portions provided a positioning hole 11 for positioning the tape cassette 1 and determining the height of the tape cassette 1. Further, the cassette case 2 includes at its central portion provided a reel lock releasing member insertion aperture 12.

A reel lock mechanism 13 comprises a pair of reel lock levers 14 supported to a slidable housing 15 and a coil spring 16. When the slidable housing 15 is assembled into an accommodating portion 2b of the cassette case 2, the reel lock levers 14 are brought in engagement with lock gears 17a and 18a formed around the outer peripheral portions of reel flanges 17 and 18 of the two tape reels 6 and 7 under spring force of the coil spring 16, thereby placing the tape reels 6 and 7 in the locked state.

Figure 3:
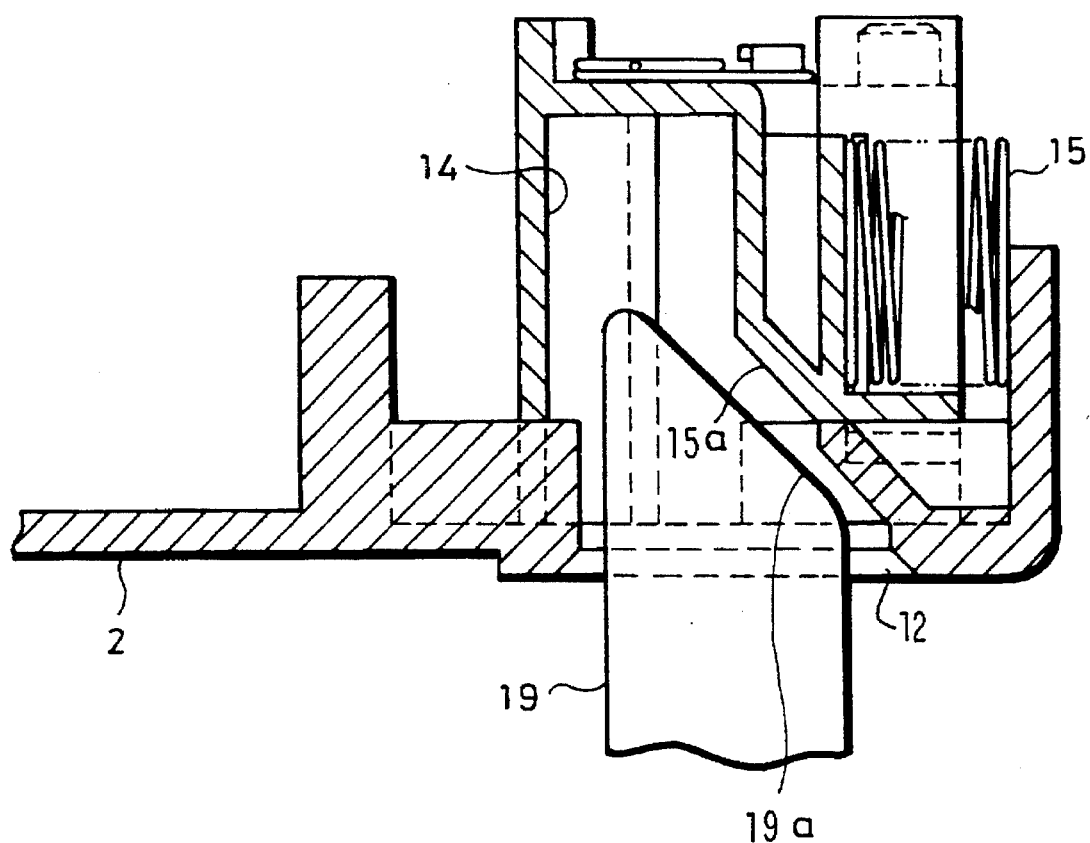
FIG. 3 is a cross-sectional view of a reel lock releasing mechanism of the large tape cassette.

When the tape cassette 1 is loaded onto a video tape recorder (VTR), not shown, a reel lock releasing member 19 provided on the VTR side is inserted into the cassette case 2 through the insertion aperture 12 bored through the bottom wall of the cassette case 2 as shown in FIG. 3.

As shown in FIG. 3, the reel lock releasing member 19 includes on its upper end portion formed an inclination edge 19a which is inclined in the rear backward direction. When the reel lock releasing member 19 is inserted into the cassette case 2, the inclination edge 19a comes in contact with an inclination portion 15a of the slidable housing 15. When the reel lock releasing member 9 is further advanced within the cassette case 2, the inclination edge 19a of the reel lock releasing member 19 pushes the inclination portion 15a of the slidable housing 15 with the result that the slidable housing 15 is urged to move backwardly and is translated backwardly against a spring-biasing force of the coil spring 16. Therefore, the reel lock levers 14 are detached from the lock gears 17a, 18a of the reel flanges 17 and 18 to release the tape reels 6 and 7 from the reel locked state.

Figure 4:
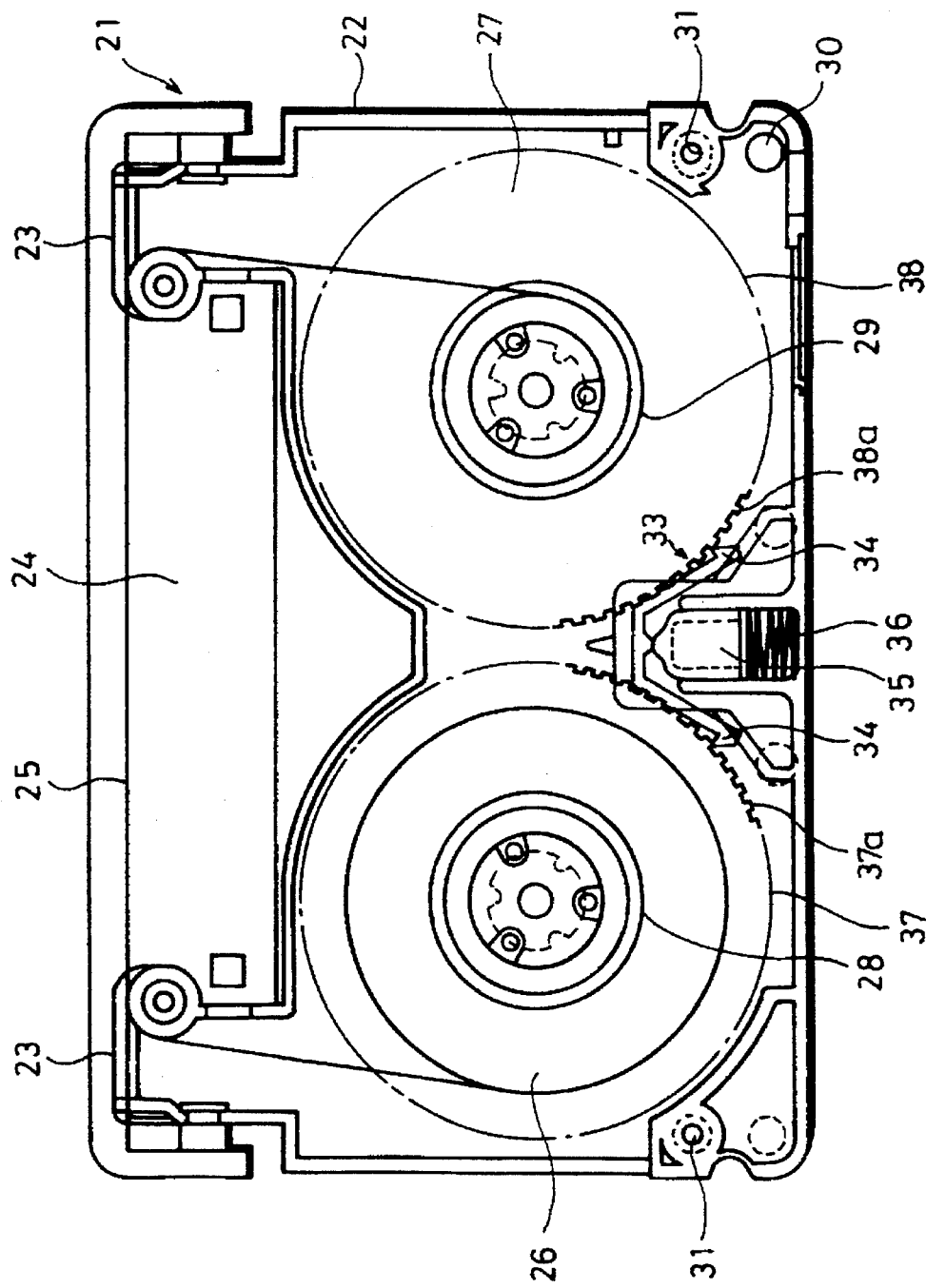
FIG. 4 is a plan view showing the inside of a small tape cassette.
Figure 5:
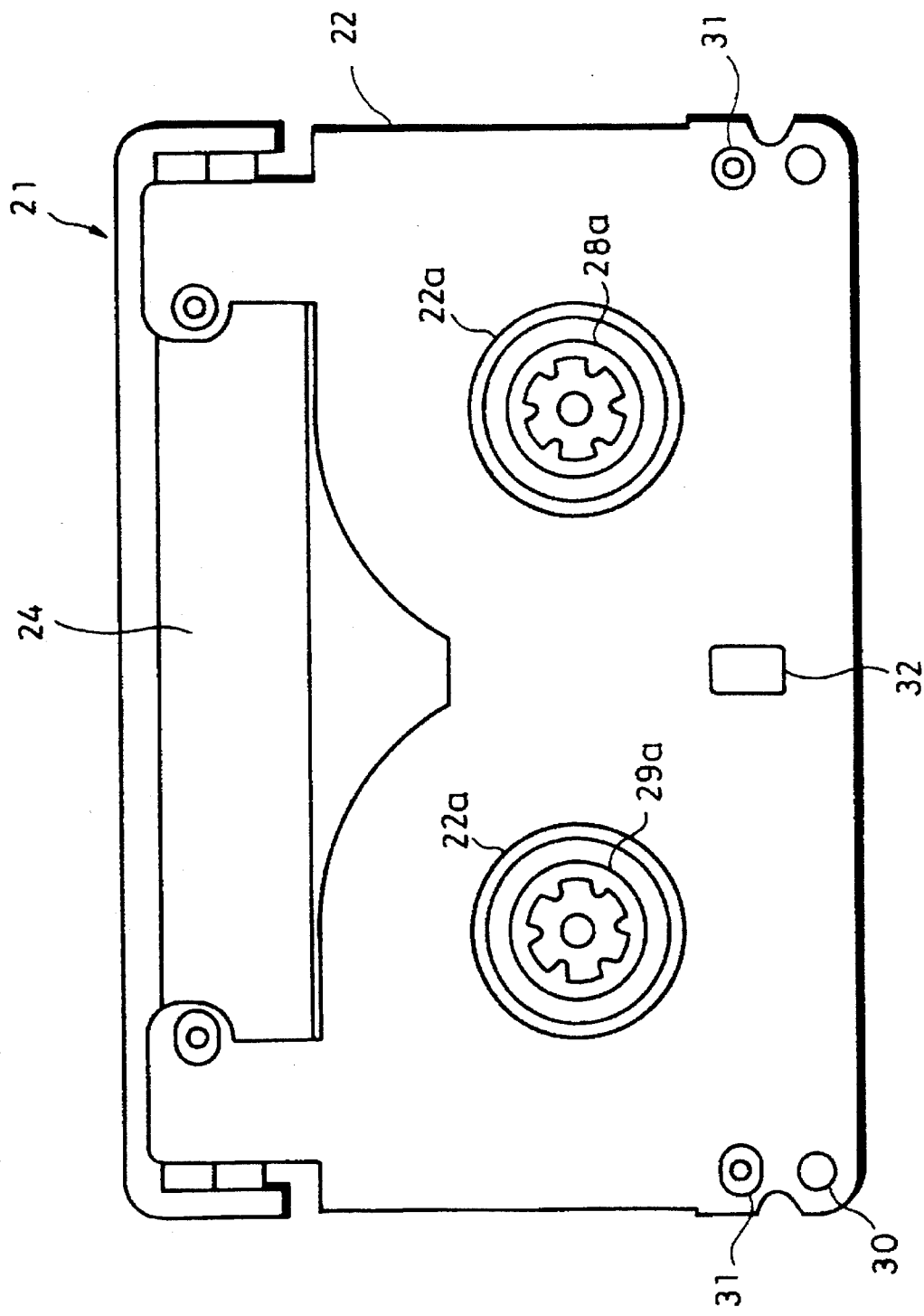
FIG. 5 is a bottom view of the small tape cassette.

FIG. 4 is a plan view of a small tape cassette with its upper shell being removed, and FIG. 5 is a bottom view of the small tape cassette. The small tape cassette is generally designated by reference numeral 21 in FIGS. 4 and 5, and reference numeral 22 designates a cassette case of the small tape cassette 21.

The cassette case 22 is flat box in shape and is oblong rectangular as seen from above. The cassette case 22 is very much smaller than the cassette case 2 of the large tape cassette 21. The cassette case 22 includes tape exits 23 and a mouth portion 24 and houses therein a supply tape reel 26 and a take-up tape reel 27 around which a magnetic tape 25 is wound.

The tape reels 26 and 27 have tape reel hubs 28 and 29 which include reel mount engagement apertures 28a and 29a which are opened in the lower ends of the reel hubs 28 and 29. The reel mount engagement apertures 28a and 29a are substantially the same in size as the reel mount engagement apertures 8 and 9 of the large tape cassette 1 and exposed to the outside through the reel mount insertion apertures 22a bored through the bottom wall of the cassette case 22 as shown in FIG. 5.

The cassette case 22 has on its one end portion of the bottom wall a recognition hole 30 for detecting information, such as a kind of tape cassette and a tape cassette content. Also, the cassette case 22 has on its respective end portions of the bottom wall positioning apertures 31 for positioning the tape cassette 21 and determining the height of the tape cassette 21. Further, the cassette case 22 has on its central portion a reel lock releasing member insertion aperture 32.

A reel lock mechanism 33 comprises a pair of reel lock levers 34, a slidable housing 35 supporting the reel lock levers 34 and a coil spring 36. The slidable housing 35 is brought in engagement with lock gears 37a and 38a of reel flanges 37, 38 under spring-biasing force of the coil spring 36, thereby locking the rotation of the tape reels 26 and 27. A releasing operation of the reel lock levers 34 is similar to that executed in the large tape cassette 1.

A reel mount spacing translating mechanism will be described with reference to FIGS. 6 and 7. A reel mount spacing translating mechanism is generally depicted by reference numeral 40 in FIGS. 6 and 7. A VTR mechanical chassis, generally depicted by reference numeral 41 is of the so-called compatible type so that it can use the two types of the small and large tape cassettes 1 and 21.

A pair of reel mount holding members 42 and 43 are shaped as an inverted V-letter and pivotally supported at their substantially intermediate portions on the mechanical chassis 41 by supporting point shafts 42a and 43a. Reel mounts 44 and 45 are pivotally supported to rotary end portions (inner end portions) of the two reel mount holding members 42 and 43. Limiting gears 44a and 45a are integrally provided with the reel mounts 44 and 45 so as to become coaxial therewith. An oscillating gear 46 can be meshed with the limiting gears 44a and 45a as a driving source.

The reel mount holding members 42 and 43 can be rotated at the supporting point shafts 42a and 43a under restriction of a pair of stoppers 47a and 47b and a pair of stoppers 48a and 48b so that the spacing between the reel mounts 44 and 45 can be adjusted in response to the positions of the small and large tape cassettes.

Rotary supporting point gears 49 and 50 are disposed so as to become coaxial with the supporting point shafts 42a and 43a of the reel mount holding members 42 and 43, and constantly meshed with the reel mounts 44 and 45. The rotary supporting point gears 49 and 50 or gears of gear trains in contact with the gears 49 and 50 are provided with tension regulator mechanisms, braking mechanisms and clutch mechanisms, though not shown.

Figure 8:
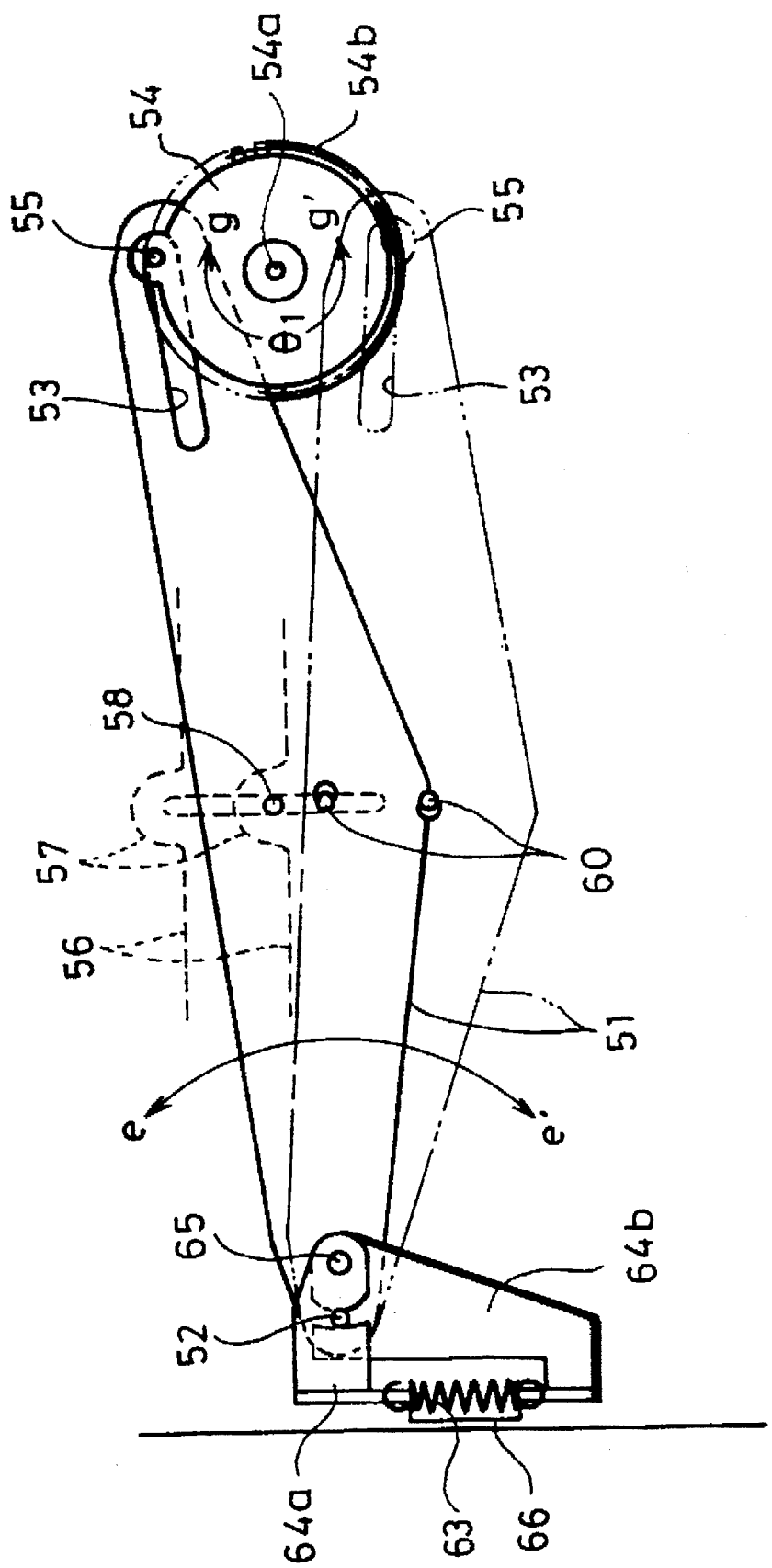
FIG. 8 is a plan view of a swing drive member and a swing arm.

A swing arm 51 is supported at a supporting point of a central shaft 52 serving as a swing center such that one end thereof is made swingable in the direction shown by arrows e–e' in FIG. 8. A rectangular opening 53 bored through the other end of the swing arm 51 is loosely fitted into a drive pin 55 provided at the deviated position of a swing drive member 54.

An interlocking member 56 is moved in unison with the motion of the swing arm 51. The interlocking member 56 has on its central portion bored through a longitudinal rectangular opening 57, and the longitudinal rectangular opening 57 is engaged with a guide pint 58 formed on the mechanical chassis 41. Further, the interlocking member 56 includes on its central portion bored through a lateral rectangular opening 59 which is in engagement with a pin 60 projected from the swing arm 51. Also, the interlocking member 56 includes at its respective ends pins 61, 61 which are fitted into rectangular openings 62 bored through the outer ends of the pair of reel mount holding members 42 and 43.

The swing drive member 54 is attached to the central shaft 54a on the mechanical chassis 41 so that it can be freely swung in a rotational angular extent $\theta_1$ of 180° or greater. A gear 54b is formed around the outer periphery of the swing drive member 54.

A limiter spring 63 is formed of a tension spring and attached between one ends of a pair of limiter arms 64a and 64b of scissors-configuration. The pair of limiter arms 64a and 64b are attached to a supporting point shaft 65 provided on the mechanical chassis 41 so that they can be freely rotated about the supporting point shaft 65 in the direction shown by arrows f–f' in FIG. 7. The central shaft 52 is commonly held to the other ends of the limiter arms 64a and 64b. Thus, the central shaft 52 is held at the fixed position under spring force of the limiter spring 63. Incidentally, a stopper 66 secured to the mechanical chassis 41 is interposed between the pair of limiter arms 64a and 64b.

In the reel mount spacing translating mechanism 40 thus arranged, when the swing drive member 54 is swung about the central shaft 54a with an rotation range of the rotational angle $\theta_1$ in the direction shown by arrows g–g' in FIG. 8, the swing arm 51 is swung about the central shaft 52 in the direction shown by arrows e–e' in FIG. 8.

Figure 6:
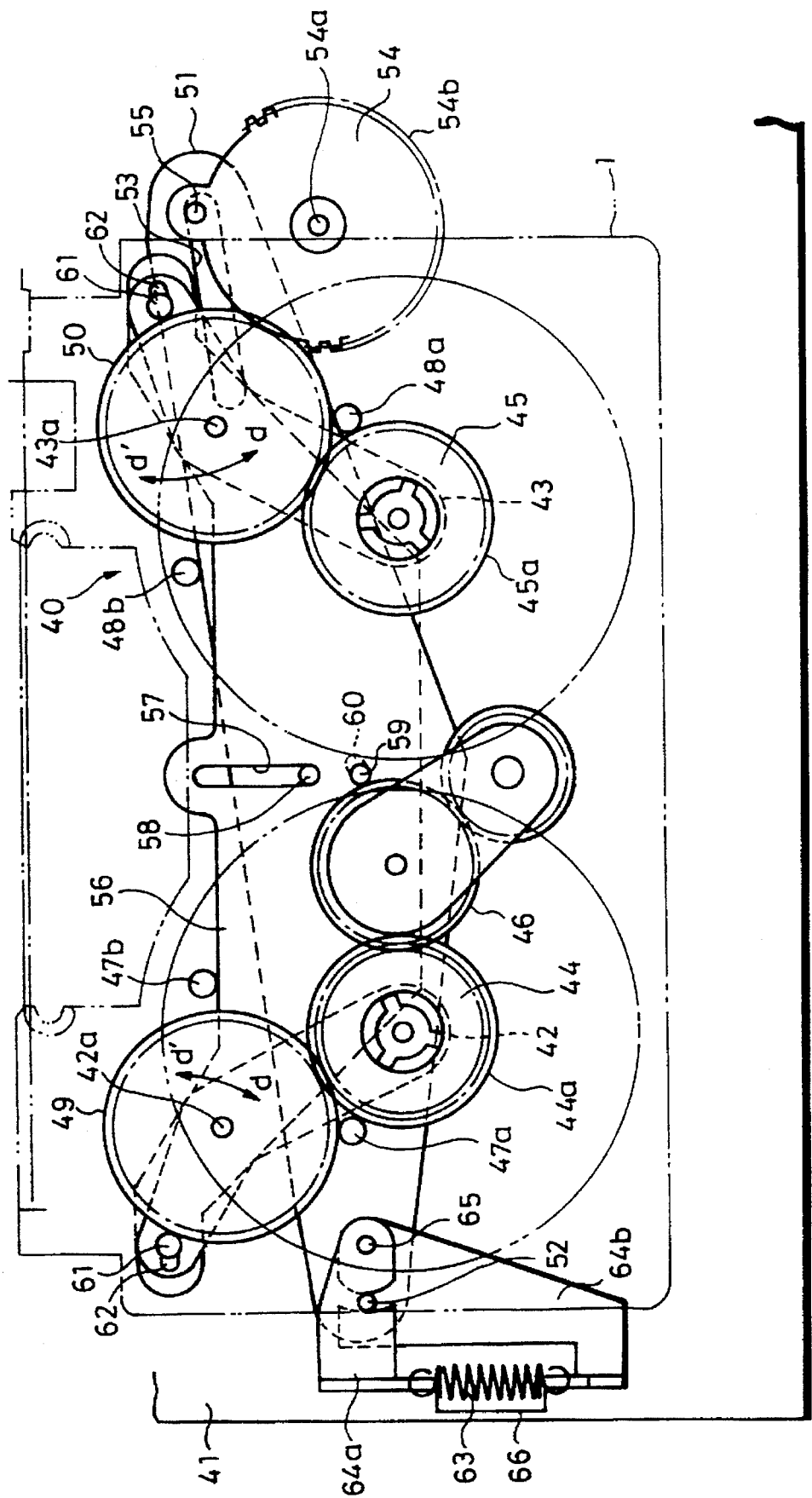
FIG. 6 is a plan view of a reel mount translating mechanism used when the large tape cassette is loaded.
Figure 7:
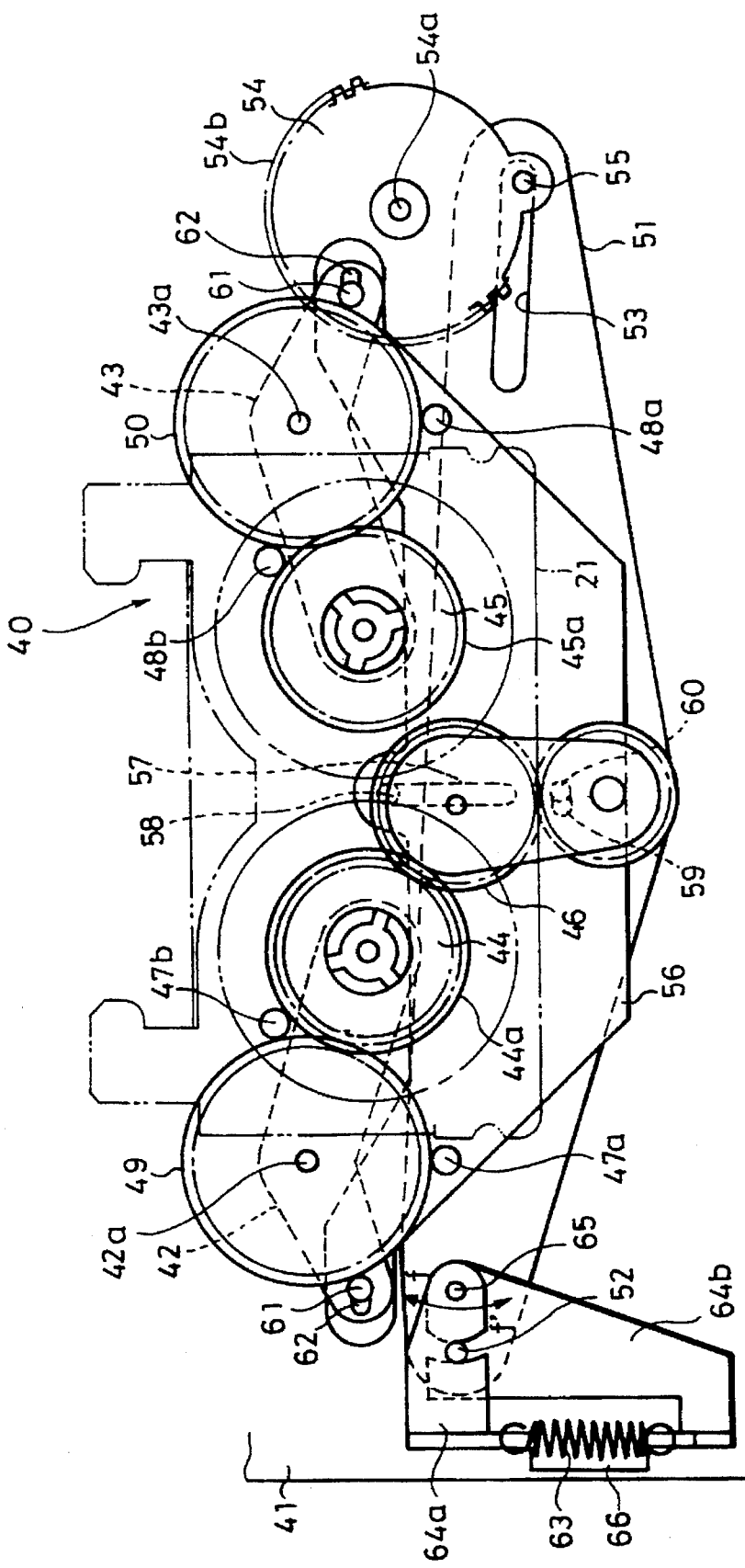
FIG. 7 is a plan view of a reel mount translating mechanism used when the small tape cassette is loaded.

When the swing arm 51 is swung in the arrow e direction in FIG. 8, for example, the pair of reel mount holding members 42 and 43 are respectively rotated about the supporting point shafts 42a and 43a through the interlocking member 56 in the direction shown by an arrow d in FIG. 6 and brought in contact with the stoppers 47a and 48a, thereby adjusting the spacing between the two reel mounts 44 and 45 to become equal to the reel spacing of the small tape cassette 1.

The translating mechanism of the tape cassette information detecting means and the reel lock releasing means will be described below.

Figure 9:
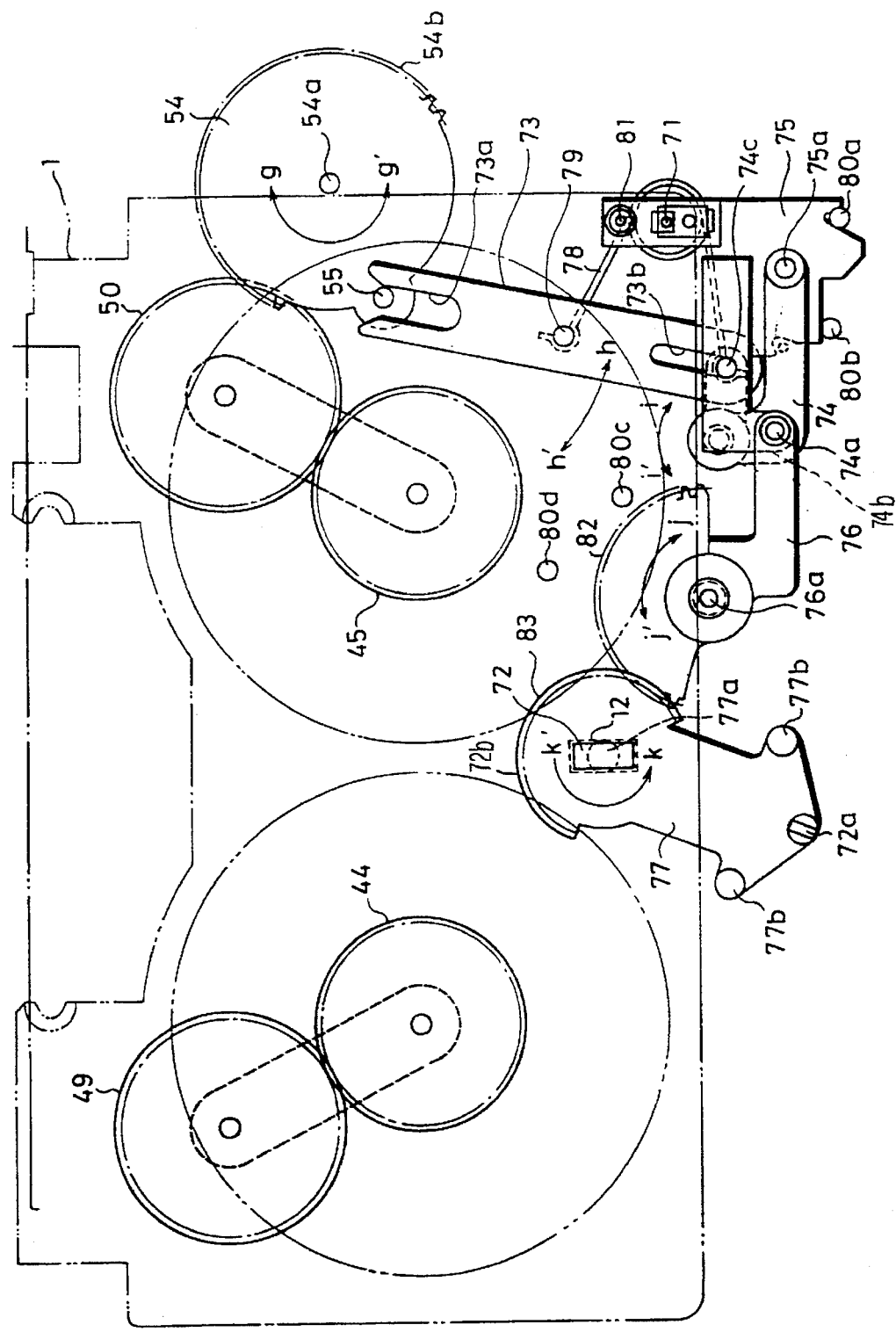
FIG. 9 is a plan view of tape cassette information detecting means and reel lock releasing means used when the large tape cassette is loaded.

As shown in FIG. 9, the translating mechanism of a tape cassette information detecting means 71 and reel lock releasing means 72a and 72b comprises a translating lever 73, a drive link 74, a detection mechanism holding member 75, a driven link 76, a reel lock releasing plate 77 and a toggle spring 78.

Figure 10:
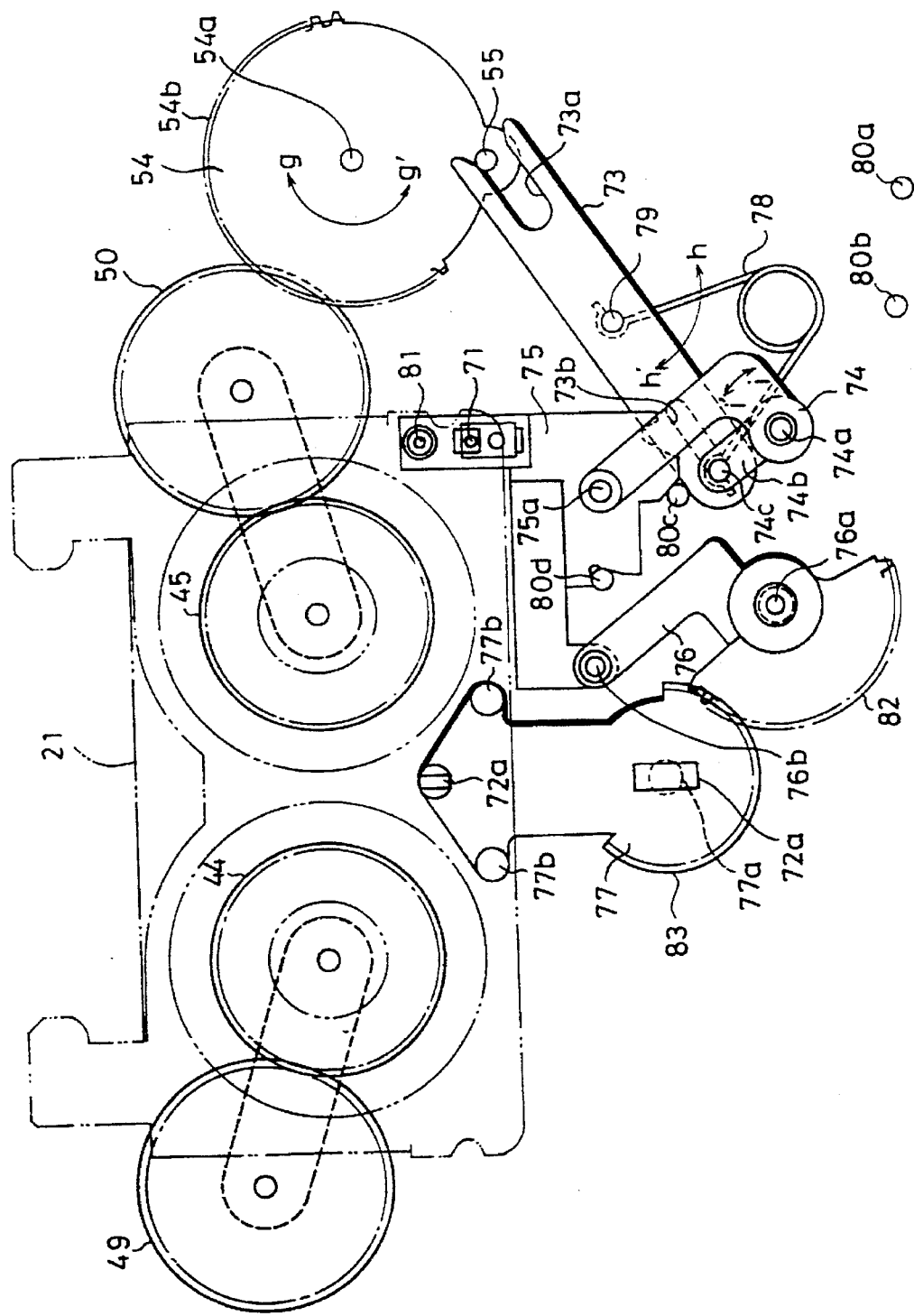
FIG. 10 is a plan view of tape cassette information detecting means and reel lock releasing means used when the small tape cassette is loaded.

The translating lever 73 is provided pivotally about a supporting point shaft 79 provided on the mechanical chassis 41 in the direction shown by arrows h–h' in FIG. 10. A slit 73a bored on one end of the translating lever 73 is engaged with a drive pin 55 of the swing drive member 54 which translates the spacing between the reel mounts 44 and 45, whereby the translating lever 73 is moved in synchronism with the movement of the reel mount. The translating lever 73 has a rectangular opening 73b defined in the other end thereof.

The drive link 74 is L-shaped and one end thereof is made pivotal about a supporting point shaft 74a provided on the mechanical chassis 41 in the direction shown by arrows i–i' in FIG. 9. Also, a pin 74c of an ancillary link 74b formed on the supporting point shaft 74a side is in engagement with the rectangular opening 73b of the translating lever 73. The other end of the drive link 74 is joined to the detection mechanism holding member 75 by means of a shaft 75a.

The toggle spring 78 is extended between a supporting point shaft 79 of the translating lever 73 and the pin 74c of the ancillary link 74b of the drive link 74 such that the spacing between the translating lever 73 and the ancillary link 74b is constantly urged to be widened under spring force of the toggle spring 78. Therefore, the drive lever 73 is urged to be toggled, i.e., constantly urged to rotate in the arrow i–i' direction across a dead point under spring force of the toggle spring 78.

The detection mechanism holding member 75 is moved by the drive link 74 and the driven link 76 in the parallel direction such that its attitude and direction are kept constant. Moreover, the detecting mechanism holding member 75 transmits the driving force, which is supplied from the toggle spring 78 to the drive link 74, to the driven link 76 when it is swung.

Stoppers 80a and 80b provided on the mechanical chassis 41 position the detection mechanism holding member 75 to hold the large tape cassette 1, and stoppers 80c and 80d position the detection mechanism holding member 75 to hold the small tape cassette 21.

Further, the detection mechanism holding member 75 includes the above-mentioned detection means 71 provided thereon. When the detection means 71 comes in contact with or comes away from the recognition holes 10 and 30 disposed at the corresponding positions of the tape cassettes 1 and 21 when the large tape cassette 1 and the small tape cassette 21 are in use, it is possible to detect the information, such as the kind of tape cassette and the cassette content. The contact of the detection means 21 with the recognition holes 10 and 30 may be replaced with the outer shape of the tape cassette and the electrical contact, such as a terminal of a semiconductor memory disposed within the tape cassette.

A tape cassette positioning portion 81 is disposed on the detection mechanism holding member 75, and the tape cassette positioning portion 81 is positioned by the positioning portions 11, 31 disposed at the corresponding positions of the tape cassettes 1 and 21 when the large tape cassette 1 and the small tape cassette 21 are in use.

The driven link 76 is rotated about the central shaft 76a provided on the mechanical chassis 41 in the direction shown by arrows j–j' in FIG. 9 and one end of the driven link 76 is joined to the detection mechanism holding member 75 by means of a pin 76b so that the driven link 76 is moved in synchronism with the movement of the reel mount. The central shaft 76a has a quadrant gear 82 provided to be coaxial therewith. The quadrant gear 82 is meshed with the reel lock releasing plate 77.

The reel lock releasing plate 77 is rotated about a central portion 77a in the direction shown by arrows k–k' in FIG. 9 and moved by a gear 83 provided to be coaxial with the central portion 77a in synchronism with the movement of the reel mount. The reel lock releasing plate 77 has a pair of tape cassette height determining portions 77b as shown in FIG. 11 so that a tape cassette height determining portion (not shown) provided at the corresponding position of the tape cassette 21 when the small tape cassette 21 is in use determines the height of the tape cassette in use.

Figure 11:
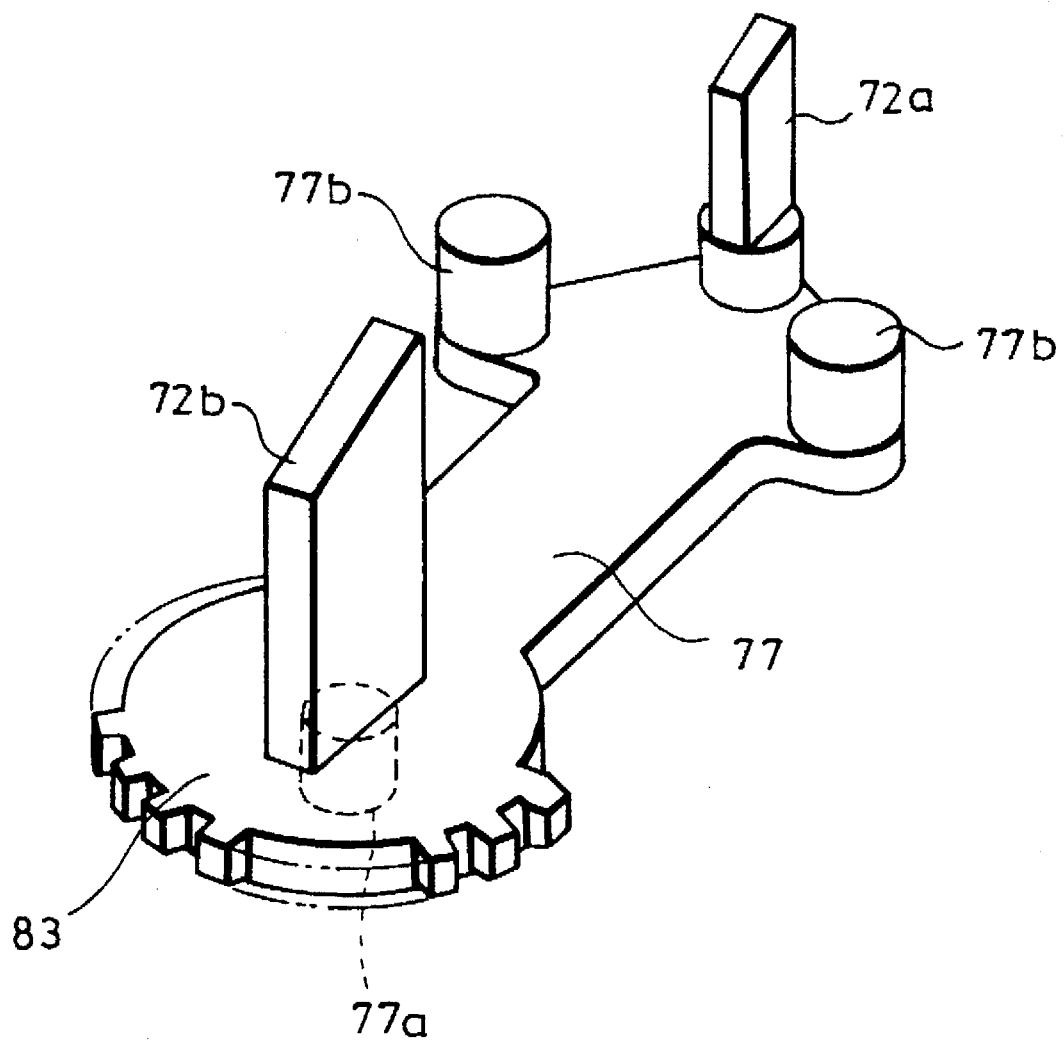
FIG. 11 is a perspective view of a reel lock releasing plate.

As shown in FIG. 11, the reel lock releasing plate 77 has a small tape cassette reel lock releasing means 72a provided thereon. A reel lock of the small tape cassette 21 is released by inserting the small tape cassette reel lock releasing means 72a into the insertion aperture 32 bored through the small tape cassette 21 at its corresponding position of the small tape cassette 21 when the small tape cassette 21 is in use.

The tape cassette height determining portion 77b and the reel lock releasing means 72a are both translated horizontally by the reel lock releasing plate 77 to the position away from the large tape cassette 1 as the reel lock releasing plate 77 is rotated in the arrow k direction shown in FIG. 9 such that they might not interfere with each other when the large tape cassette 1 is in use.

The reel lock releasing plate 77 includes a large tape cassette reel lock releasing mechanism 72b provided on the axis of the central portion 77a thereof. It is possible to release the large tape cassette 1 from the locked state by inserting the reel lock releasing mechanism 72b into the insertion aperture 12 defined at the corresponding position of the large tape cassette 1 when the large tape cassette 1 is in use.

The tape cassette information detecting means 71 and the reel lock releasing means 72a and 72b are arranged as described above. Therefore, in order to load the large tape cassette 1, the reel mounts 44 and 45 are translated to the position of the large tape cassette 1 so that, when the swing drive member 54 is rotated in the arrow g direction shown in FIG. 9, the translating lever 73 is rotated in the arrow h direction in FIG. 9 and the drive link 74 is rotated in the arrow i direction, thereby rotating the driven link 76 in the arrow k direction. Thus, the tape cassette information detecting means 71 and the reel lock releasing means 72a and 72b can be translated to the position corresponding to the large tape cassette 1 when the large tape cassette 1 is in use in synchronism with the motion of the reel mounts 44 and 45.

In order to load the small tape cassette 21, the reel mounts 44 and 45 should be moved to the position of the small tape cassette 21. Therefore, when the swing drive member 54 is rotated in the arrow g' direction, the translating lever 73 is rotated in the arrow h' direction, the drive link 74 is rotated in the arrow i' direction, the driven link 76 is rotated in the arrow j' direction through the detection mechanism holding member 75 and the reel lock releasing plate 77 is rotated in the arrow k' direction so that the tape cassette information detecting means 71 and the reel lock releasing means 72a and 72b can be translated to the position determined when the small tape cassette 1 is in use in synchronism with the motion of the reel mounts 44 and 45.

In the recording and reproducing apparatus in which the supply reel 44 and the take-up reel 45 can be translated to the two different positions in response to the small and large tape cassettes 1 and 21, since the tape cassette information detecting means 71 for detecting information, such as the kind of tape cassette and the tape cassette content and the reel lock releasing means 72a and 72b are translated in response to the small and large tape cassettes 1 and 21, the number of the assembly parts constructing the mechanical deck portion can be reduced and the mechanical deck portion can be designed with increased freedom. Moreover, the recording and reproducing apparatus can be miniaturized, reduced in weight and made inexpensive.

As Japanese laid-open patent publication No. 4-49558 discloses, the swing drive member 54 may be rotated by a holder translating mechanism of a cassette loading apparatus and driven by an exclusive-designed motor or the like. Alternatively, the swing drive member 54 may be driven by a driving force obtained from other driving sources.

As Japanese laid-open utility model publication No. 62-98031, the reel mount spacing translating mechanism may translate a pair of reel mounts between the reel mounts by using a pair of guide shafts in a straight line fashion.

As described above, the recording and reproducing apparatus according to the present invention comprises the detection means provided in the equipment body portion for detecting information, such as the kind of tape cassette and a tape cassette content and the releasing means provided in the equipment body portion for translating the detection means to positions corresponding to the tape cassettes of different sizes and releasing the reel lock mechanism which inhibits the two tape reels from being rotated within the tape cassette, in which the releasing means can be translated to positions corresponding to the tape cassettes of different sizes. Therefore, it is possible to obtain a novel recording and reproducing apparatus in which the number of assembly parts constructing the mechanical deck portion and the mechanical deck portion can be designed with increased freedom. Moreover, the recording and reproducing apparatus according to the present invention can be miniaturized, made light-weighted and inexpensive.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording and reproducing apparatus in which two tape cassettes of different sizes having supply reels and take-up reels spaced apart by different widths around which a recording medium tape is wound are loaded and two reel mounts which respectively come in engagement with said supply reel and said take-up reel are moved at different positions, said recording and recording apparatus comprising:

detecting means provided in an equipment body of said recording and reproducing apparatus for detecting information, such as kind and content of said tape cassette; and releasing means provided in said equipment body of said recording and reproducing apparatus for releasing a reel lock mechanism which inhibits said two tape reels from being rotated within a tape cassette, wherein when said reel mounts are moved said detecting means and said releasing means can be automatically moved to predetermined positions in response to the size of said tape cassettes of different sizes in unison with each other after loading of the tape cassette into said recording and reproducing apparatus.

2. The recording and reproducing apparatus according to claim 1, wherein said detecting means and said releasing means are moved in unison with a movement of said reel mounts.

3. The recording and reproducing apparatus according to claim 1, further comprising tape cassette positioning mechanism provided in a member which is moved together with said detecting and/or releasing means.

* * * * *